United States Patent [19]

May

[11] Patent Number: 5,259,294
[45] Date of Patent: Nov. 9, 1993

[54] SHOCK-ABSORBING PISTON MADE UP OF DISSIMILAR JOINED PARTS, BLANK FOR THE PISTON AND METHOD FOR MANUFACTURING THE PISTON

[75] Inventor: Ewald May, Bonn, Fed. Rep. of Germany

[73] Assignee: Ringsdorff-Werke GmbH, Bonn, Fed. Rep. of Germany

[21] Appl. No.: 859,332

[22] Filed: Mar. 27, 1992

[30] Foreign Application Priority Data

Mar. 27, 1951 [DE] Fed. Rep. of Germany ....... 4110023

[51] Int. Cl.$^5$ .......................... F01B 31/00; F01L 21/04
[52] U.S. Cl. ...................... 92/181 P; 92/185; 92/249; 92/256; 91/228; 29/888.042; 29/888.044; 188/322.15; 188/322.22
[58] Field of Search .......... 91/222, 220, 228; 92/181 R, 181 P, 184, 185, 256, 255, 249; 29/888.04, 888.042, 888.044; 188/282, 317, 322.15, 322.22

[56] References Cited

U.S. PATENT DOCUMENTS

| | | | |
|---|---|---|---|
| 2,859,296 | 11/1958 | Nev | 29/888.044 |
| 3,093,891 | 6/1963 | Karlgaard | 29/888.044 |
| 3,338,552 | 8/1967 | Persicke | 92/181 R |
| 3,827,538 | 8/1974 | Morgan | 92/256 X |
| 4,961,482 | 10/1990 | Pohlenz et al. | 188/317 X |
| 4,993,524 | 2/1991 | Grundei et al. | 188/322.22 |

FOREIGN PATENT DOCUMENTS

| | | | |
|---|---|---|---|
| 0275368 | 7/1988 | European Pat. Off. | |
| 3734002 | 4/1989 | Fed. Rep. of Germany | 188/322.22 |
| 3824420 | 2/1990 | Fed. Rep. of Germany | |
| 0091930 | 4/1989 | Japan | 29/888.04 |

Primary Examiner—Edward K. Look
Assistant Examiner—Hoang Nguyen
Attorney, Agent, or Firm—Herbert L. Lerner; Laurence A. Greenberg

[57] ABSTRACT

A shock-absorbing piston, a blank for the piston and a method for producing the piston include two parts being constructed radially symmetrically, but formed with outer and inner parts differing from each other. This offers great variability in the shaping of the functionally essential elements of the shock-absorbing piston.

28 Claims, 6 Drawing Sheets

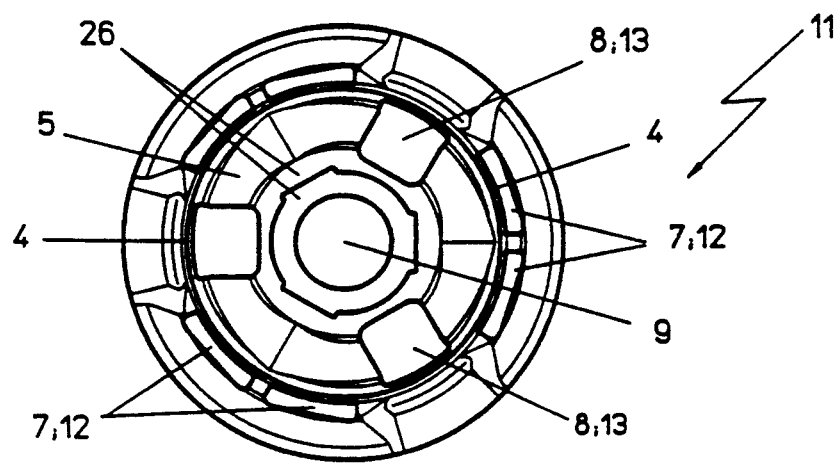
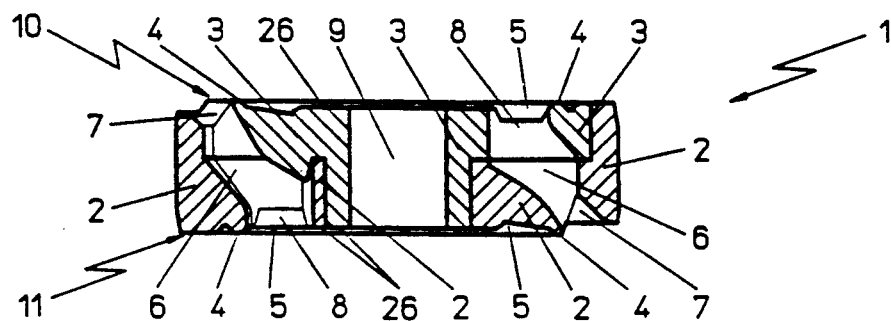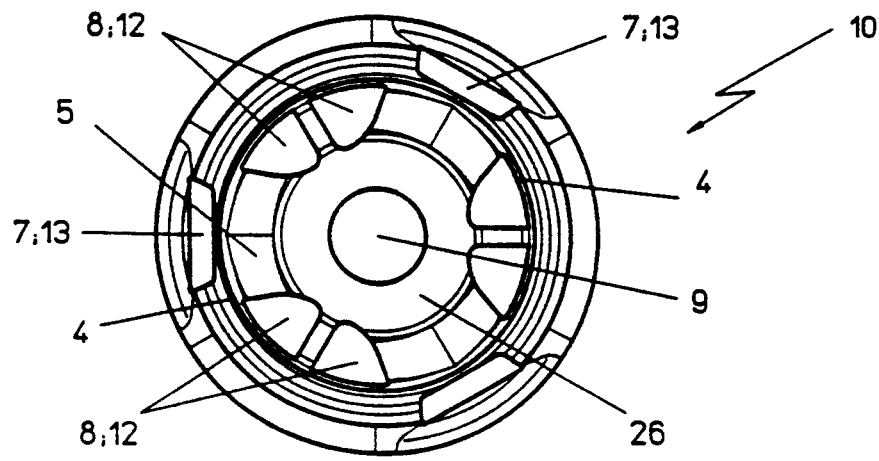

SHOCK-ABSORBING PISTON MADE UP OF DISSIMILAR JOINED PARTS, BLANK FOR THE PISTON AND METHOD FOR MANUFACTURING THE PISTON

The invention relates to a shock-absorbing piston which is able to be mounted on a piston rod and is produced from at least two parts by joining, as well as a blank for a shock-absorbing piston that is produced from at least two parts by joining. After its completion to form a shock-absorbing piston, the blank can be mounted on a piston rod extending in the direction of the central axis of the shock-absorbing piston. The shock-absorbing piston and the blank for the shock-absorbing piston have an annular shoulder rotating at a distance from the central axis and enclosing an annular chamber on upper and lower surfaces or sides thereof. Centrally and elastically clamped valve plates or valve spring plates for covering the annular chambers rest on the shoulder in the later ready-for-operation state. The shock-absorbing piston and the blank therefor have two groups of liquid passage channels through which a flow can take place in opposing directions and which are separated by partition walls. One of the groups serves for the throughflow in a traction or suction stage and the other for a throughflow in a pressure stage of the shock-absorbing piston. The one group of liquid passage channels begins with inlet openings radially outside the rotating annular shoulder of the upper surface of the piston, penetrates the piston substantially in the direction of the central axis in an inclined manner and terminates at the lower surface in outlet openings in the annular chamber. The other group penetrates the piston in the reverse manner with inlet openings beginning radially on the outside of the rotating annular shoulder of the lower surface of the piston, penetrating the piston substantially in the direction of the central axis in an inclined manner and terminating at the upper surface in outlet openings in the annular chamber. The invention also relates to a method for manufacturing such bodies.

In manufacturing technology today, efforts are made to manufacture molded bodies of metallic materials or plastics which must be manufactured in large quantities, while avoiding expensive machining processing or minimizing the processing when such avoidance is not completely possible. Methods which are used for this purpose are molding processes being carried out at room temperature or elevated temperature, pressure die casting, precision casting, punching, punching and subsequent shaping, powder metallurgy and sintering methods. In the powder metallurgy manufacture, powder is pressed into correspondingly shaped dies with stamps, which can be profiled, possibly using punches, and if necessary using temperature, to form molded bodies and then sintered, possibly again with the use of pressure. Parts that are formed of plastics can either be manufactured from powders or granules in a corresponding manner at suitable temperatures with a molding process including a method stage corresponding to sintering or in a plastic state in an injection molding method, if required. However, the formation of undercuts on and in the molded bodies being produced is problematic in such manufacturing processes. In those cases one often falls back on combinations of the processes and machining.

The methods of manufacturing indicated above are also used in the production of shock-absorbing pistons. The requirements for molding technology in the manufacture of modern shock-absorbing pistons are great and there have been attempts to manufacture such molded bodies while avoiding cutting treatment stages, if possible.

For example, in German Patent DE 38 24 420 C1, a piston for a hydraulic telescopic damper device is described, in each case having a group of liquid passage channels extending at an incline relative to the piston rod axis for the traction and for the pressure direction, in which the internal radius of the inlet side passage channels emanating from the piston rod axis is approximately as large as the external radius of the outlet side passage channels. According to that construction, a one-part piston body can be manufactured without a machining treatment, in such a way that when pressing, each part of the pressing tool forming a half section of the channel is immersed in the powder axially in the direction of the piston rod axis, in each case from one front surface of the later piston body. According to that method, shock-absorbing pistons with certain undercuts can be molded, but there are disadvantages therein, namely that the tools shaping the passage channels and being immersed in the powder are subject to great wear and tear, which causes high maintenance costs or bad sizing accuracy. Moreover, the tools are very susceptible to breaking. Furthermore, when pressing, a ridge forms in each of the passage channels, which must be removed by expensive subsequent treatment, since otherwise during such an operation, parts of the ridges can loosen and render the shock-absorber unusable in a short time through wear and tear. Finally, such shock-absorbing pistons do not have a circular annular shoulder determined by the manufacture. Instead they jump backwards and forwards.

Shock-absorbing pistons which can be manufactured by powder metallurgy, in which the liquid passage channels optimally fill out the space theoretically provided therefor in the piston body, and which therefore have undercuts, are disclosed in Published European Application No. 0 275 368 A2. In order to manufacture such pistons, piston body halves that are constructed identically and which can be produced, for example, by means of an equatorial section through the piston, with the halves containing the input and output openings and the delimitations of the liquid passage channels, are produced by powder metallurgy and then joined according to known methods. The teaching of that European application relates only to shock-absorbing pistons in which the liquid passage channels take up the largest possible space and, according to a preferred embodiment, the shock-absorbing pistons are formed of two identical parts. That structure greatly restricts the possibilities for molding the pistons and their construction. Thus, for example, according to that teaching, it is not possible to obtain shock-absorbing pistons being joined from at least two parts, with liquid passage channels thereof being formed differently on the traction side and the pressure side. Furthermore, the possibilities for forming the liquid passage channels in accordance with technical flow features are restricted. A disadvantage of that technical solution to the problem is also that because of the method, halves that are connected tightly and in a liquid-tight manner in the region of the central bush when joining to the shock-absorbing piston, but loosely radially outwards, rest on each other, so that narrow gaps form there. On one hand, the gaps cause undesired mutual bypass problems between the internally-lying channels, and on the other hand, between the channels and the annular groove of the piston. Moreover, the introduction by machining of the annular groove of the piston in a casing of a shock-absorbing piston being formed of two parts is less favorable in terms of processing technology than in a one-part cylindrical piston casing.

It is accordingly an object of the invention to provide a shock-absorbing piston made up of dissimilar joined parts, a blank for the piston and a method for manufacturing the piston, which overcome the hereinafore-mentioned disadvantages of the heretofore-known methods and devices of this general type, which is not restricted in the construction of its functional elements, in particular the construction of technically useful flow passage channels, and which is able to be manufactured without machining treatment or with minimal machining treatment.

With the foregoing and other objects in view there is provided, in accordance with the invention, a blank for further processing to form a shock-absorbing piston or a shock-absorbing piston itself, comprising at least two joined parts of dissimilar shape. Furthermore, methods are indicated for manufacturing such blanks or shock-absorbing pistons.

The parts which are denoted herein as blanks for shock-absorbing pistons, already have all of the essential elements for the functioning of a shock-absorbing piston, such as liquid passage channels with upper and lower surface openings thereof, annular shoulders, annular chambers, a hollow cylinder disposed in the center or a hub for receiving the piston rod and for assembling the spring elements, an accurately predetermined outer diameter and possibly bevels and profiles. These parts and structural elements are understood in the description given below to be the functional elements of the shock-absorbing piston. The difference between a blank and a finished shock-absorbing piston is that the blank must still be processed subsequently to a slight extent, in order to satisfy all requirements of a finished shock-absorbing piston. For example, such subsequent processing may be a calibrating process, the cutting of an annular grove into the cylindrical outer surface, the chamfering of edges or the surface-grinding or facing of the annular shoulders. A decision as to whether or not such subsequent treatment is necessary depends on the tolerance requirements for tee finished product. However, it is possible to manufacture shock-absorbing pistons according to the invention directly without such subsequent treatment. Therefore, as used below, the expression "shock-absorbing piston" is the equivalent of the expressions "blank for a shock-absorbing piston" and "shock-absorbing piston".

The construction of two joined parts, that are dissimilar with regard to their "structural shape", which has the same meaning in this case as the word "shape", is possible for shock-absorbing pistons according to a plurality of variations.

In all variants for which protection is required in this case, the parts, which form the shock-absorbing pistons after assembly, in a relatively wide sense have the shape of a flat cylinder, in which either the upper or the lower boundary surface is at least partially absent. The boundary surface remaining in each case is provided with recesses, profiles and openings, which extend around the assumed central axis of the cylinder and/or are disposed in a sequence that is predetermined by a multiple rotational axis. The cylinder casing can be closed, but it can also have recesses, profiles and openings, which are also disposed in a sequence that is predetermined by a multiple rotational axis. A common feature of all variations and modifications is that a shock-absorbing piston is obtained with a simple assembly and connection of the parts.

The shock-absorbing piston is formed from a first outer part which is formed of an outer casing, on which inwardly projecting fittings of a special shape are preformed, and it is also formed from at least one second inner part, which has a peg in the center, from which preformed parts, that are also of a special shape, extend outwards. The respective fittings and preformed parts of the special shape of the outer and of the inner part are complementary and after assembly they produce the functional elements of the shock-absorbing piston, in particular the liquid passage channels. The peg of the inner part is provided with a central round or polygonal recess. In the finished shock-absorbing piston, this recess or passage serves to receive either the piston rod or a calibrated tube, into which the piston rod is then inserted. This tube has a round or even polygonal outer casing corresponding to the shape of the recess in the peg.

The outer part is defined on the outside by the cylindrical casing, when seen in the radial direction. The inner part terminates on the outside with the inner wall of the cylindrical casing of the outer part, when seen in the radial direction. It fits into the outer part and can engage in slots located in the inner wall of the cylindrical casing of the outer part, should such a structural form be provided. Both parts are provided with an annular shoulder rotating at a distance from the central axis on one of their flat sides forming a part of either the upper or of the lower surface in the later shock-absorbing piston. The shoulder can be round or can have another curved shape which, however, separates the flow inlet and flow outlet chambers of the liquid passage channels from each other. The slits or recesses for the inlet openings of the liquid passage channels are located radially outside the annular shoulder on both parts, while disposed radially within the annular shoulder are the slits or recesses for the outlet openings of the liquid passage channels. It is only in some cases that the recesses for the inlet and outlet openings show the contour of a channel opening surrounded on all sides by a boundary, and the liquid passage channels are only predetermined through the shaping in the parts but are not easily recognizable as such. The liquid passage channels and the complete shock-absorbing piston are formed only on the intended joining of the inner part with the outer part, in such a manner that the liquid passage channels for the traction side and for the pressure side of the shock-absorbing piston are formed from the complementary recesses, profiles and openings of both parts. The other elements which are essential for the functioning of the device, such as the annular shoulders and the annular chambers surrounded thereby, were already preformed on the flat sides of the outer part and the inner part, which later form the upper and the lower surface of the piston body. In most cases the annular chambers are also formed firstly by the assembly of the parts. The fixing of parts to each other by a force-locking and mainly also by a form-locking connection and the sealing of the liquid-guiding parts against leakage occurs through the use of means which are available in the state of the art e.g. above all by pressing together but also by sintering, welding, soldering or sticking or suitable combinations of such methods. A form-locking connection is one which connects two elements together due to the shape of the elements themselves, as opposed to a force-locking connection, which locks the elements together by force external to the elements. Shock-absorbing pistons of iron or such alloys are often coated with a magnetite layer. In addition to bonding or reinforcing the connection of the parts, this serves to increase the surface hardness and to seal against leakages.

According to one embodiment, the liquid passage channels for the traction and the pressure stage in such a shock-absorbing piston have the same shape. In contrast to known shock-absorbing pistons that are manufactured without shaping by machining processes, these shock-absorbing pistons have an optimum technical flow shaping of the liquid channels, because when compiling the details of the supplementary parts forming the liquid passage channels, the engineer has essentially more freedom than with other methods.

This freedom in the shaping also enables shock-absorbing pistons to be created in which the liquid passage channels for the traction stage have a different shape from that for the pressure stage, with it also being possible in this case for shapes for the construction of certain flow characteristics to be produced in an intended manner. It is thus possible, despite different shaping of the channels for the traction stage and for the pressure stage, to set both varying and identical flow characteristics. This is important because the damping ratio of the traction side to the pressure side usually deviates more or less greatly from one, in shock-absorbing technology.

The liquid passage channels for the traction and pressure stage are disposed concentrically and alternately around the central axis or, in the assembled state, around the piston rod. The liquid passage channels of one or both of the stages can thereby also be disposed in pairs and can follow each other alternately in pairs, or pairs of channels of one stage can alternate with single or individual channels of the other stage. Depending on the size and function of the shock-absorbing piston, a total of four liquid passage channels or even more can also be disposed alternately next to each other, i.e. two channels for the pressure and two for the traction stage. It can also be advantageous to construct one of the two openings of a liquid passage channel in the form of two openings lying next to each other and to let the two initial channels open into one.

By considering the possibilities of construction described above, one can optimally adapt shock-absorbing pistons of this type to all requirements which are important for manufacturing and use.

Shock-absorbing pistons can also be formed of two flat cylindrical parts, which are obtained by horizontal sections or cuts, i.e. sections which are perpendicular to the central axis of the shock-absorbing piston at any height of the flat cylinder. However, this method by far does not offer shaping possibilities like those described above and below.

For metallic materials, the manufacture of the parts which are combined to form the shock-absorbing piston can take place according to known casting methods such as pressure die casting or precision casting or powder metallurgy. Plastic parts are made by drop-forging, sintering and molding as well as injecting molding or transfer molding. The choice of which of the above-named methods is used, depends on the material to be processed and the question of expense. Metals such as aluminum, zinc, magnesium, copper, tin and lead as well as alloys thereof can be processed according to a casting method. Suitable metals are above all copper, aluminum, iron and alloys of these metals for processing using powder metallurgy. Furthermore, shock-absorbing pistons can be made of temperature and oil-resistant thermoplasts and also from thermosetting plastics with or without a proportion of fillers. Plastics which are particularly suitable are polyamides, polyimides, polyamidimides, polyarylene oxides, polyarylene ethers, polyarylene sulphides and polyarylene sulphones, polyarylenes, per and partially fluorinated polymers such as tetrafluorethylene, fluoroethylene, fluoropropylene, fluoroalkoxyvinyl ethers and fluoroalkoxy terpolymers as well as phenolic resins, furan resins, epoxy resins, resins of unsaturated polyesters, of diallyl phthalate and bismaleimide resins. Powders of coke, graphite, metals such as bronze, carbon black or glass fibers, carbon or graphite fibers, arylamide fibers or asbestos, are preferably used as fillers. Moreover, further fillers which are known can be used.

A large part of the shock-absorbing pistons are manufactured from iron or iron alloys. Powder metallurgic methods are particularly suitable for their manufacture. These methods which are also known under the name sinter-metallurgic methods, are described in detail in the literature, e.g. see German Published, Non-Prosecuted Application DE 37 34 002 A1. They are simple and inexpensive to carry out.

A shock-absorbing piston according to the invention can be manufactured as follows: by using correspondingly shaped pressing dies, stamps, and punches, at least two types of molded body are pressed from a metal or plastic powder of a grain size and composition adapted to the respective purpose of use, while possibly also adding auxiliary pressing agents, release agents or plasticizing agents, so that considering the volume alterations when manufacturing, the bodies have the shape and dimensions of the partial bodies required for the assembly. On one hand, the substantially cylindrical casing bodies are provided with interior fittings and have shapes that are described precisely above, and on the other hand the inner bodies fitting into the casing bodies are formed of a peg provided with an axial passage, on which the interior fittings that are complementary to the interior fittings of the casing body are preformed. As already described above, the casing bodies and their interior fittings and the inner bodies and their interior fittings are constructed in such a way that after joining they produce the functional elements of the shock-absorbing piston. According to a manufacturing variant, the passage for receiving the piston rod is pressed-in as well when pressing the inner body. According to another variant, a central recess of a cylindrical or polygonal and usually hexagonal shape, is pressed into the inner body. Moreover, with the latter variant, a tube fitting exactly into the central recess of the inner body must be pressed, so that during later assembly of the parts to form the shock-absorbing piston, the tube is inserted into the recess. The inner passage of this tube then serves to receive the piston rod. Complicatedly constructed shock-absorbing pistons can also be assembled from more than the parts described thus far. These additional parts are produced in the same manner by pressing. Other methods through which these parts can be manufactured are, for metallic materials, pressure die casting, precision casting, punching, as well as punching followed by shaping and, for plastics, injection molding or die-casting.

The shaping of the parts can occur at ambient or elevated temperature. The height of the temperature depends on the material which is being processed and it can be seen on the appropriate tabulated compilation. Often the molding process is linked to a sintering process. After releasing the mold, the parts belonging together are assembled to form a shock-absorbing piston. Normally these parts are the casing body, the inner body and possibly the tube to be inserted into the center of the inner body. With complicatedly constructed shock-absorbing pistons, correspondingly more parts are joined together. An additional sintering process can follow the assembly. When this is not necessary the parts are firmly connected together by a molding process. With this molding process the piston bodies are calibrated at the same time and the joints are sealed between the individual parts in a liquid-tight manner. The afore-mentioned methods are only valid in relation to material-specific properties for metallic materials as well as for plastics with and without filler contents. Other methods for force-locking connection of the parts with respect to one another are welding, soldering or sticking together, such as by gluing.

Another method which is suitable for metallic materials uses punching alone or punching with subsequent shaping. In this case the parts are punched out either directly from plates with the aid of punch tools of a suitable shape, with the parts being put together later to form a shock-absorbing piston or in a first working process blanks for these parts are punched out and these are then brought by a mechanical shaping process into the form desired for the following assembly. There then follows the assembly and the subsequent working processes described above.

If necessary, machining treatment processes can also be used such as plunge-cutting the annular groove on the outer cylinder casing of the piston body. With bodies of iron or iron alloys it is advantageous, in order to increase the surface hardness and further sealing of the parts among one another, for the gas-accessible surface of the shock-absorbing piston to be covered with a magnetite layer by treatment with superheated or overheated water vapor at a high temperature, according to the method of German Published, Non-Prosecuted Application DE 37 34 002 A1.

Through the use of the invention, a shock-absorbing piston is prepared which is not subject to any restriction with regard to the construction of its structural features within a useful technical framework, and which can be manufactured by expedient methods that are tried and tested in manufacturing technology. In particular, as a result of the construction of this body, the elements which are essential for functioning can be shaped out in any way from essentially freely structured parts. Thus the liquid passage channels can be constructed for setting each absorbing characteristic, whether it is preferably linear, progressive or decreasing. Shock-absorbing pistons with varying absorbing characteristics for the traction and for the pressure side can also be created with the aid of correspondingly formed liquid passage channels. The further functional elements such as openings for the liquid passage channels, annular shoulders and annular chambers can be adapted to the functional requirements in all respects. The shaping of all of the parts when manufacturing is possible in an efficient manner. A possibility which results to a particular degree with the invention is that of combining the shaping requirements given by the functional requirements when constructing the shock-absorbing piston and the parts from which they should be built, with a minimum of material usage in production. The shock-absorbing piston according to the invention is sealed because of its construction of one inner part and one outer part. Bypass problems do not occur in practice. The introduction of the outer annular groove is unproblematic.

Other features which are considered as characteristic for the invention are set forth in the appended claims.

Although the invention is illustrated and described herein as embodied in a shock-absorbing piston made up of dissimilar joined parts, a blank for the piston and a method for manufacturing the piston, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic, cross-sectional view of a shock-absorbing piston formed of two dissimilar parts;

FIG. 2 is top-plan view of the shock-absorbing piston according to FIG. 1;

FIG. 3 is a bottom-plan view of the shock-absorbing piston according to FIG. 1;

Figure 13:
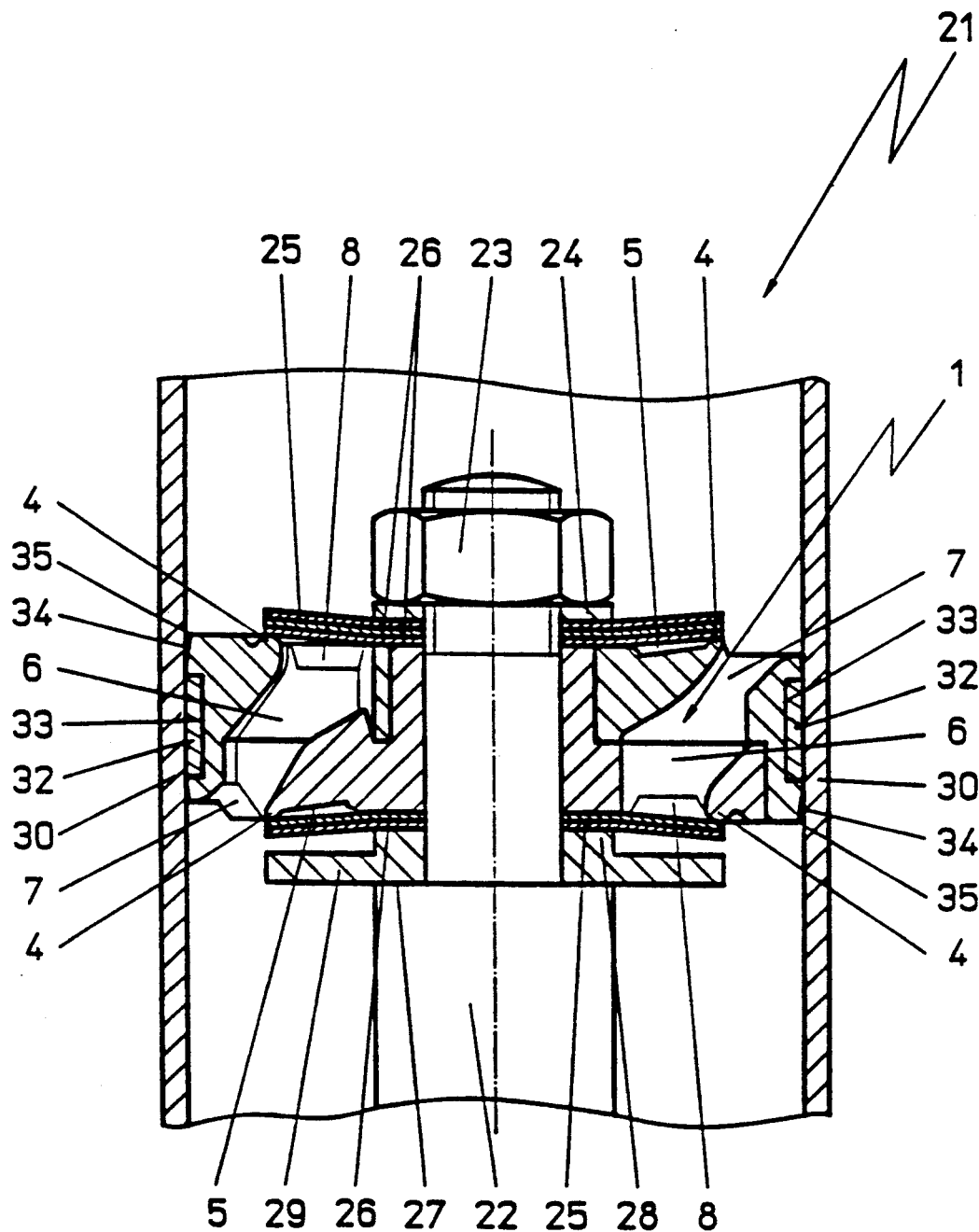
FIG. 13 is a fragmentary, axially-sectional view of a single-duct shock-absorber with a built-in shock-absorbing piston.

Referring now to the figures of the drawing in detail and first, particularly, to FIG. 1 thereof, there is seen a shock-absorbing piston 1 according to the invention being formed of an outer casing part 2 and an inner part 3 located within the casing part 2. An upper surface or side 10 and a lower surface or side 11 of the shock-absorbing piston 1 each have an annular shoulder 4, which defines annular chambers 5 extending radially inwardly from the annular shoulders 4. The shock-absorbing piston is penetrated in a substantially axial direction by liquid passage channels 6. The channels 6 end in the two flat surfaces or sides 10, 11 of the shock-absorbing piston 1. Each of these liquid passage channels 6 has at least one inlet opening 7, which lies radially outside the annular shoulder 4 and an outlet opening 8, which lies radially inside the annular shoulder 4. A cylindrical passage 9 and an annular stop 26 are located in the center of the shock-absorbing piston 1. Both the cylindrical passage 9 and the annular stop 26 are used in the assembly of the shock-absorbing piston 1 on a piston rod 22, which is shown in FIG. 13.

In FIG. 2, the upper surface or side 10 and in FIG. 3 the lower surface or side 11 of the shock-absorbing piston 1, are shown. In both figures the following elements of the shock-absorbing piston can be seen:

the annular shoulder 4, the annular chamber 5, the inlet openings 7 of the liquid passage channels 6, the outlet openings 8 of the liquid passage channels 6, the axial, central cylindrical passage 9 and the annular stop 26 for the assembly of the shock-absorbing piston 1 on the piston rod 22. In the present case there are two similar liquid passage channels 12 disposed in pairs alternately next to individual or single liquid passage channels 13. FIG. 2 shows the outlet openings 8 of the liquid passage channels 12 that are disposed in pairs and the inlet openings 7 of single liquid passage channels 13. FIG. 3 shows the inlet openings 7 of the liquid passage channels 12 that are disposed in pairs, as well as the outlet openings 8 of the single liquid passage channels 13.

Figure 6:
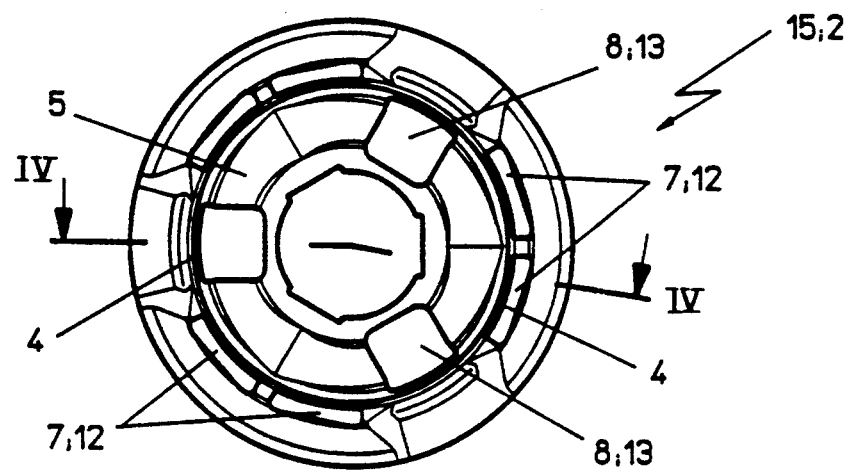
FIG. 6 is a bottom-plan view of the casing part of the shock-absorbing piston according to FIG. 4.
Figure 4:
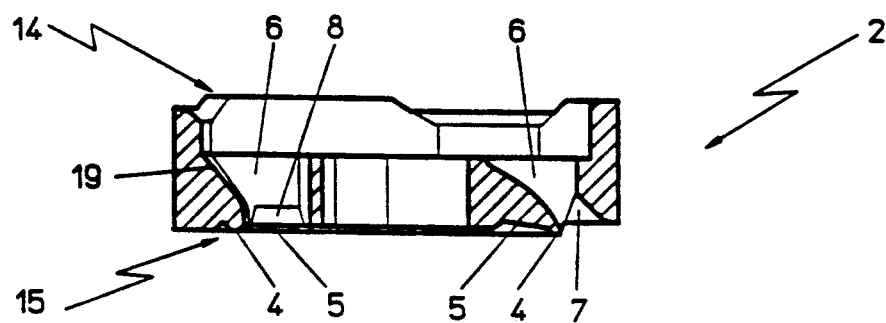
FIG. 4 is a cross-sectional view taken along a line IV-IV in FIG. 5 and FIG. 6 in the direction of the arrows, showing a casing part of the shock-absorbing piston according to FIG. 1.
Figure 5:
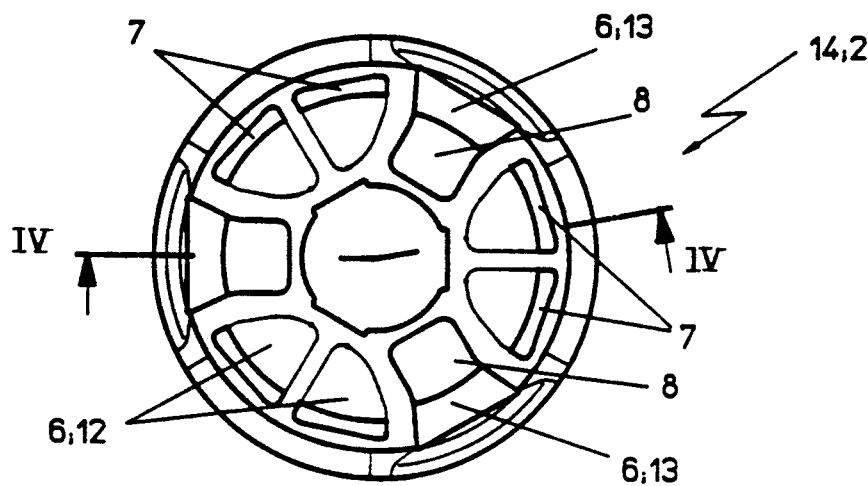
FIG. 5 is a top-plan view of the shock-absorbing piston part according to FIG. 4.

FIG. 4 shows the casing part 2 of the shock-absorbing piston 1 of FIG. 1 in a cross-section taken along the line A-B in FIG. 5 and FIG. 6. FIGS. 5 is a plan view of an upper surface or side 14 and FIG. 6 is a plan view of a lower surface or side 15. FIG. 4 shows: the annular shoulder 4 and the annular chamber 5 enclosed by the shoulder on the lower surface or side 11 (seen in FIGS. 1 and 3) of the shock-absorbing piston 1, the two liquid passage channels 6, the inlet opening 7 of one of the liquid passage channels 12 that are disposed in pairs (as seen in FIGS. 2 and 3) and an outlet opening 8, as well as a radially outwardly-lying inner wall 19 of one of the single liquid passage channels 1 (shown in FIGS. 2 and 3). In FIG. 5, in which the annular shoulder 4 and the annular chamber 5 cannot be shown, reference numerals 6;12 represent the liquid passage channels that are disposed in pairs and reference numerals 6;13 represent the single passage channels 13. Moreover, the inlet openings 7 of the liquid passage channels 12 that are disposed in pairs and the outlet openings 8 of the single liquid passage channels 13 are shown. The plan view of the lower surface or side in FIG. 6 shows the annular shoulder 4, the annular chamber 5, the inlet openings 7 of the liquid passage channels 12 that are disposed in pairs and the outlet openings 8 of the single liquid passage channels 13.

Figure 9:
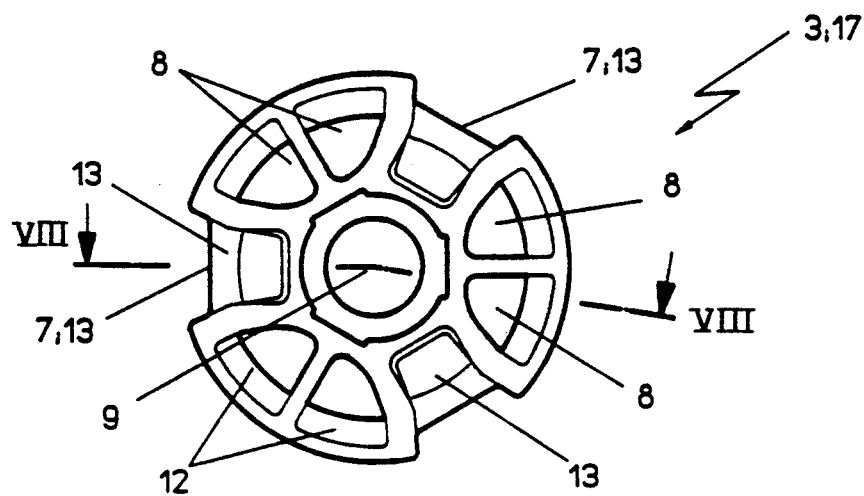
FIG. 9 is a bottom-plan view of the shock-absorbing piston part according to FIG. 7.
Figure 7:
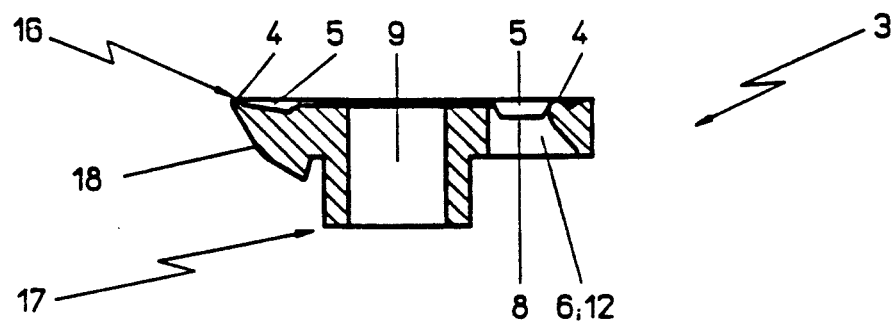
FIG. 7 is a cross-sectional view taken along a section line VII-VIII in FIG. 8 and FIG. 9, in the direction of the the arrows, showing an inner part of the shock-absorbing piston according to FIG. 1 to be inserted into the casing part according to FIG. 4.
Figure 8:
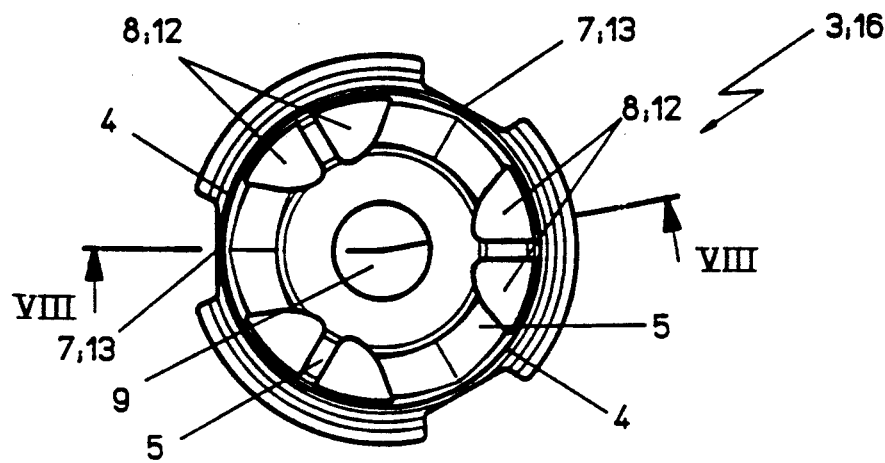
FIG. 8 is a top-plan view of the inner part of the shock-absorbing piston according to FIG. 7.

In FIGS. 7, 8 and 9, firstly FIG. 7 is a cross-section taken along the line in FIG. 8 and FIG. 9, secondly FIG. 8 is a plan view of an upper surface or side 16 and thirdly FIG. 9 is a plan view of a lower surface or side 17 of the inner part 3. FIG. 7 shows the annular shoulder 4 of the upper surface or side 10 of the shock-absorbing piston 1 in FIG. 1, the annular chamber 5 enclosed by this annular shoulder 4, the outlet opening 8 of one of the liquid passage channels 6;12 that are disposed in pairs, the axially central cylindrical passage 9 and a radially inwardly-lying wall 18 of the single liquid passage channel 13 (seen in FIGS. 2 and 3). The plan view of the upper surface or side 16 of the inner part 3 in FIG. 8 shows the annular shoulder 4 of the upper surface or side 10 (seen in FIGS. 1 and 2) of the shock-absorbing piston 1, the annular chamber 5 enclosed by this annular shoulder 4, the outlet openings 8 of the liquid passage channels 12 that are disposed in pairs, a radially inner partial piece of the inlet opening 7 of the singly disposed liquid passage channels 13 (seen in FIG. 2) and the axial central cylindrical passage 9. FIG. 9 shows a plan view of the lower surface or side 17, and therefore the section of the inner part 3 facing inwardly in the shock-absorbing piston 1. The following can be seen: the liquid passage channels 12 disposed in pairs and their outlet openings 8, the upper radially inwardly-lying delimitation of the inlet opening 7 for the singly disposed liquid passage channels 13 and the upper part of the singly disposed liquid passage channels 13, which is open radially outwardly as well as the axial central cylindrical passage 9. By inserting the inner part 3 (seen in FIG. 7) in the casing part 2 ( seen in FIG. 4) in the manner shown in FIG. 1 and subsequently connecting the two parts with each other, the shock-absorbing piston represented in FIGS. 1, 2 and 3 is obtained.

Figure 12:
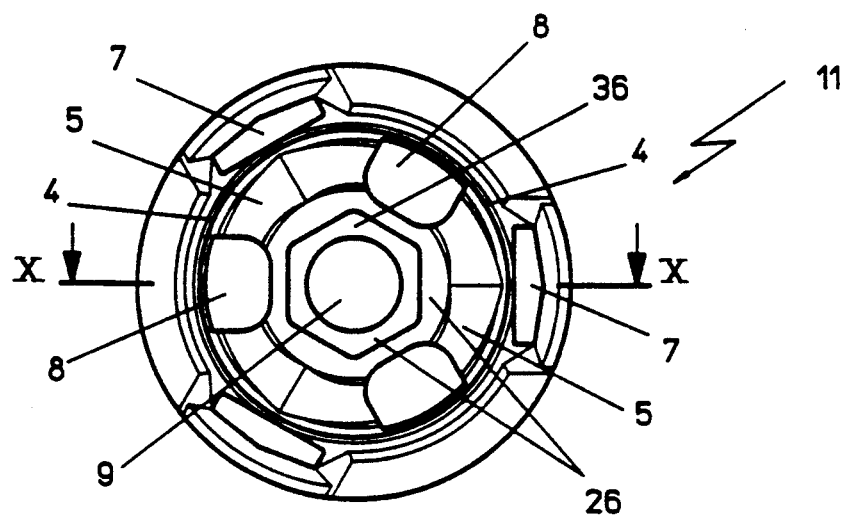
FIG. 12 is a bottom-plan view of the shock-absorbing piston corresponding to FIG. 10.
Figure 10:
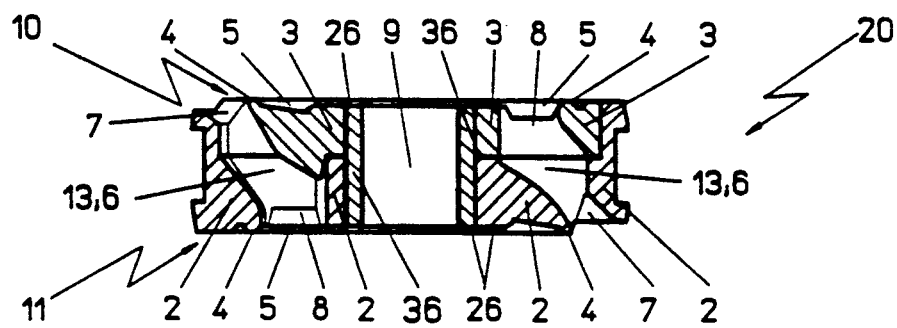
FIG. 10 is a cross-sectional view of another shock-absorbing piston according to the invention, being formed of two dissimilar parts and being taken along the section line X-X in FIG. 11 and FIG. 12, in the direction of the arrows.
Figure 11:
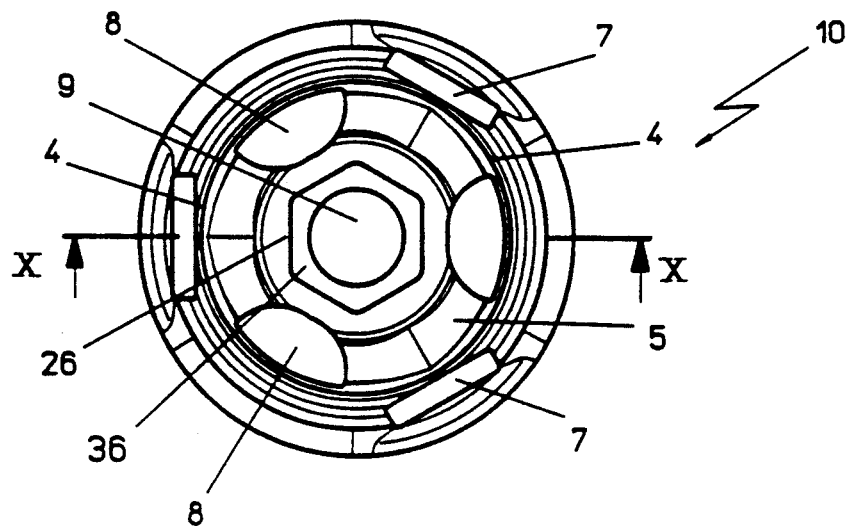
FIG. 11 is a top-plan view of the shock-absorbing piston corresponding to FIG. 10.

FIGS. 10, 11 and 12 illustrate another shock-absorbing piston 20 according to the invention. This shock-absorbing piston 20 differs from the shock-absorbing piston 1 because the liquid passage channels 6 are constructed and disposed differently. Furthermore, it has an additional central sleeve 36 for receiving the piston rod. The liquid passage channels 12 that are disposed in pairs in FIGS. 2 and 3 are not present in this case. The liquid passage channels 13 that are all disposed individually or singly follow each other alternately. They have otherwise shaped inlet openings 7 and outlet openings 8, which are also formed differently in this example for the pressure stage and the suction, drawing or traction stage. In FIG. 10, a cross-section is seen through the shock-absorbing piston 20 which is taken along the line E-F in FIGS. 11 and 12. The illustration of the figures and the numbering of the details therein correspond substantially to the descriptions given in FIGS. 1, 2 and 3 for the first shock-absorbing piston 1 and can be carried over to FIGS. 10, 11 and 12. Exceptions are the designations for the paired and the singly disposed liquid passage channels 12 and 13. A detailed description of FIGS. 10, 11 and 12 can be omitted because of the above-mentioned capability of carrying over the description given above.

FIG. 13 is a section which represents a portion of a single-duct shock-absorber 21 with a built-in shock-absorbing piston 1 according to the invention. The shock-absorbing piston 1 is pushed onto the end of the piston rod 22 and is secured by a nut 23, which at the same time acts through a supporting plate 24 to press annularly-shaped valve spring plates 25 in an elastic manner against the stops 26 lying in the piston rod vicinity in the annular chamber 5 of the shock-absorber piston 1 on one hand, and onto the annular shoulder 4 on the other hand. On the lower surface or side, the shock-absorbing piston 1 also lies on the valve spring plates 25, which are clamped by way of the upper nut 23 on the piston rod surface or side by means of a supporting plate 28 that is supported on a projection 27 of the piston rod 22 against a stop 26 in the lower annular chamber 5 and at the same time rests elastically and sealingly on the lower annular shoulder 4. The supporting plate 28 in this case is provided with a supporting flange 29 for protecting the supporting plates 25 against too great run-in impact.

The shock-absorbing piston 1 mounted on the piston rod 22 is able to be mounted in a displaceable manner in a cylindrical tube 30 of the shock-absorber 21. As can be seen from FIGS. 1 and 10, the shock-absorbing piston 1; 20 is penetrated by the liquid passage channels 6, which have the inlet openings 7 lying outside the annular shoulder 4 and the outlet openings 8 lying within the annular shoulder 4 in the annular chambers 5. A piston ring 32 which is disposed in an annular groove 33 in the cylindrical casing surface of the shock-absorbing piston 1, seals the shock-absorbing piston 1 against the shock-absorbing tube 30. Chamfers 34 on upper and lower edges 35 of the shock-absorbing piston facilitate low-wear movements of the shock-absorbing piston 1 in the tube 30 of the shock-absorber. The absorbing effect and the absorbing characteristics of the shock-absorber can be set by the shape of the liquid passage channels 6 and the setting and type of valve spring plates 25.

Figure 14:
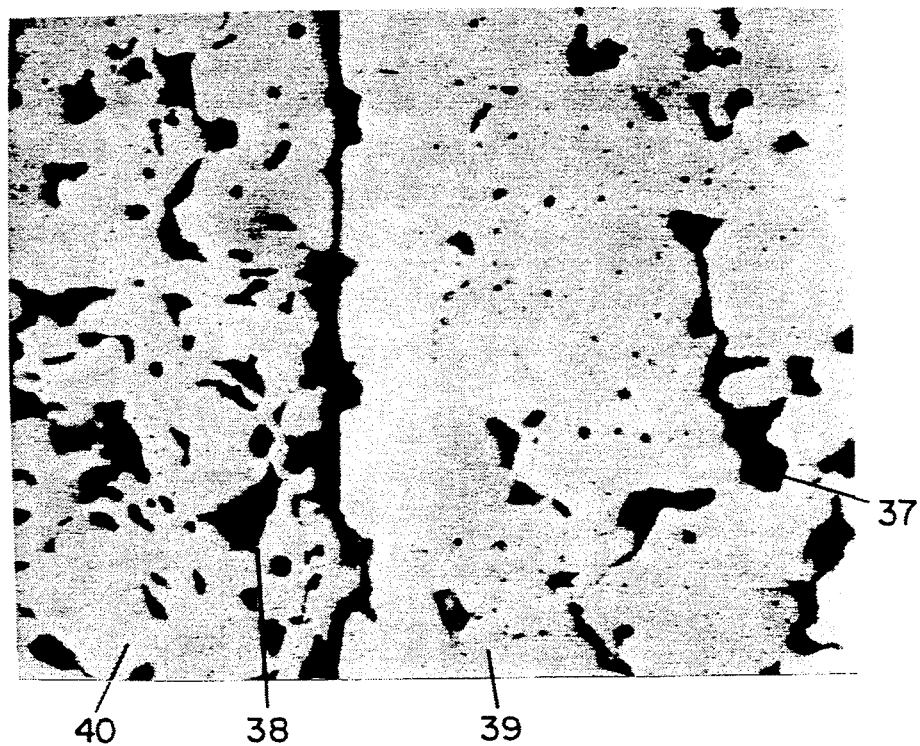
FIG. 14 is a ground section photograph of a joined sintered piston.

FIG. 14 is a ground section photograph of a joined sintered piston in which the light grey is sinter material, i.e. Fe grains of various size. At some locations the grains are sintered together and remaining pores 37 (black) are inbetween.

Since the central bushing is denser than the piston halves, the picture part 39 with the lower number of pores must be the central bushing and the picture part 40 with the higher number of pores must be the piston half. The medium grey 38 is $Fe_3O_4$.

It can be easily seen that the powder grains of the bushing and of the piston body have partly interlocked, and are partly clearly separated from one another by a straight gap. Such a joint is not very rigid against shifting.

Only the partial filling of the gap with $Fe_3O_4$, in connection with a certain increase in the hardness of the overall texture, leads to an increase in the shifting force by a factor of 10.

I claim:

1. A shock-absorbing piston, comprising:
   at least two joined-together parts with dissimilar shapes,
   said parts having an upper surface, a lower surface, annular shoulders each being disposed at a respective one of said upper and lower surfaces, annular chambers each being enclosed by a respective one of said annular shoulders, two groups of liquid passage channels for carrying flows in opposing directions,
   said liquid passage channels of one of said groups having inlet openings disposed radially outside said annular shoulder of said upper surface and terminating at said lower surface in outlet openings in said annular chamber, and
   said liquid passage channels of the other of said groups having inlet openings disposed radially outside said annular shoulder of said lower surface and terminating at said upper surface in outlet openings in said annular chamber,
   wherein said parts are an outer casing part having interior fittings and an inner part fitting into said outer casing part when assembled to produce functional elements, and said inner part is an axially disposed peg having an axial passage for receiving said piston rod and having fittings disposed on said peg being complementary to said interior fittings of said outer casing part.

2. A blank for a shock-absorbing piston to be mounted on a piston rod, comprising:
   at least two parts with dissimilar shape to be joined together after completion to form a shock-absorbing piston,
   said parts having an upper surface, a lower surface, annular shoulders each being disposed at a respective one of said upper and lower surfaces for rotation at a distance from the central axis, annular chambers each being enclosed by a respective one of said annular shoulders, two groups of liquid passage channels for carrying flows in opposing directions, and partition walls separating said liquid passage channels, one of said groups of liquid passage channels serving for throughflow in a traction stage and the other of said groups of liquid passage channels serving for through flow in a pressure stage,
   said liquid passage channels of one of said groups having inlet openings disposed radially outside said rotating annular shoulder of said upper surface, penetrating said parts substantially in the direction of the central axis at an incline and terminating at said lower surface in outlet openings in said annular chamber,
   said liquid passage channels of the other of said groups having inlet openings disposed radially outside said rotating annular shoulder of said lower surface, penetrating said parts substantially in the direction of the central axis at an incline and terminating at said upper surface in outlet openings in said annular chamber,
   wherein said parts are an outer casing part having interior fittings and an inner part fitting into said outer casing part when assembled to produce functional elements, said inner part being an axially disposed peg having an axial passage for receiving said piston rod and having fittings disposed on said peg complementary to said interior fittings of said outer casing part.

3. The blank for a shock-absorbing piston according to claim 1, wherein said parts contain function elements and a tube connected to and disposed centrally in said parts, said tube having a central passage for receiving said piston rod.

4. The blank for a shock-absorbing piston according to claim 1, wherein said liquid passage channels for the traction and the pressure stage have the same shape.

5. The blank for a shock-absorbing piston according to claim 1, wherein said liquid passage channels for the traction stage have a shape and a throughflow characteristic differing from said liquid passage channels for the pressure stage.

6. The blank for a shock-absorbing piston according to claim 1, wherein said liquid passage channels for the traction stage have a different shape than said liquid passage channels for the pressure stage, and said liquid passage channels for the traction and the pressure stage have the same throughflow characteristics.

7. The blank for a shock-absorbing piston according to claim 1, wherein said liquid passage channels for the traction stage and the pressure stage are disposed singly and are alternately next to each other concentrically around the central axis.

8. The blank for a shock-absorbing piston according to claim 1, wherein said liquid passage channels for the traction stage and the pressure stage are disposed in pairs and are alternately next to each other concentrically around the central axis.

9. The blank for a shock-absorbing piston according to claim 1, wherein said groups of liquid passage channels are two liquid passage channels for the traction stage and two liquid passage channels for the pressure stage, and each of said channels of the pressure stage is followed by a channel of the traction stage.

10. The blank for a shock-absorbing piston according to claim 1, wherein said liquid passage channels include more than four liquid passage channels disposed alternately next to each other for the traction and the pressure stage.

11. A shock-absorbing piston according to claim 1, wherein said parts have a gas-accessible surface being covered by a magnetite layer.

12. A shock-absorbing piston to be mounted on a piston rod, comprising:
at least two parts with dissimilar shapes to be joined together,
said parts having an upper surface, a lower surface, annular shoulders each being disposed at a respective one of said upper and lower surfaces for rotation at a distance from said piston rod, annular chambers each being enclosed by a respective one of said annular shoulders, two groups of liquid passage channels for carrying flows in opposing directions, and partition walls separating said liquid passage channels, one of said groups of the liquid passage channels serving for throughflow in a traction stage and the other of said groups of liquid passage channels serving for throughflow in a pressure stage,
said liquid passage channels of one of said groups having inlet openings disposed radially outside said rotating annular shoulder of said upper surface, penetrating said parts substantially in the direction of the central axis at an incline and terminating at said lower surface in outlet openings in said annular chamber,
said liquid passage channels of the other of said groups having inlet openings disposed radially outside said rotating annular shoulder of said lower surface, penetrating said parts substantially in the direction of the central axis at an incline and terminating at said upper surface in outlet openings in said annular chamber, and
wherein said parts are an outer casing part having interior fittings and an inner part fitting into said outer casing part when assembled to produce functional elements, and said inner part is an axially disposed peg having an axial passage for receiving said piston rod and having fittings disposed on said peg being complementary to said interior fittings of said outer casing part.

13. The shock-absorbing piston according to claim 12, wherein said parts contain function elements and a tube connected to and disposed centrally in said parts, said tube having a central passage for receiving said piston rod.

14. The shock-absorbing piston according to claim 12, wherein said liquid passage channels for the traction and the pressure stage have the same shape.

15. The shock-absorbing piston according to claim 12, wherein said liquid passage channels for the traction stage have a shape and a throughflow characteristic differing from said liquid passage channels for the pressure stage.

16. The shock-absorbing piston according to claim 12, wherein said liquid passage channels for the traction stage have a different shape than said liquid passage channels for the pressure stage, and said liquid passage channels for the traction and the pressure stage have the same throughflow characteristics.

17. The shock-absorbing piston according to claim 12, wherein said liquid passage channels for the traction stage and the pressure stage are disposed singly and are alternately next to each other concentrically around the central axis.

18. The shock-absorbing piston according to claim 12, wherein said liquid passage channels for the traction stage and the pressure stage are disposed in pairs and are alternately next to each other concentrically around the central axis.

19. The shock-absorbing piston according to claim 12, wherein said groups of liquid passage channels are two liquid passage channels for the traction stage and two liquid passage channels for the pressure stage, and each of said channels of the pressure stage is followed by a channel of the traction stage.

20. The shock-absorbing piston according to claim 12, wherein said liquid passage channels include more than four liquid passage channels disposed alternately next to each other for the traction and the pressure stage.

21. A shock-absorbing piston according to claim 12, wherein said parts have a gas-accessible surface being covered by a magnetite layer.

22. A method for manufacturing a blank for a shock-absorbing piston, which comprises:
processing and minimally machining a material selected from the group consisting of the metals aluminum, zinc, magnesium, copper, tin, lead, iron, alloys of the metals, temperature and oil-resistant thermoplasts and thermosetting plastics;
forming the material into a substantially cylindrical casing body having an inner wall from which interior fittings extend inwardly;
forming the material into an inner body in the form of a peg having an axial passage for receiving a piston rod extending along a central axis of the blank, an outer wall from which interior fittings extend radially outwardly at most to the inner wall of the cylindrical casing of the casing body while being complementary to the interior fittings of the casing body;
inserting the inner body into the casing body and combining the interior fittings of the inner body with the interior fittings of the casing body to form an upper surface, a lower surface, annular shoulders each being disposed at a respective one of the upper and lower surfaces for rotation at a distance from the central axis, annular chambers each being enclosed by a respective one of the annular shoulders, two groups of liquid passage channels for carrying flows in opposing directions, and partition walls separating the liquid passage channels, one of the groups of liquid passage channels serving for throughflow in a traction stage and the other of the groups of liquid passage channels serving for throughflow in a pressure stage,
the liquid passage channels of one of the groups having inlet openings disposed radially outside the rotating annular shoulder of the upper surface, penetrating the parts substantially in the direction of the central axis at an incline and terminating at the lower surface in outlet openings in the annular chamber, the liquid passage channels of the other of the groups having inlet openings disposed radially outside the rotating annular shoulder of the lower surface, penetrating the parts substantially in the direction of the central axis at an incline and terminating at the upper surface in outlet openings in the annular chamber; and detachably connected the inner body and the casing body with each other.

23. A method for manufacturing a blank for a shock-absorbing piston, which comprises:

processing and minimally machining a material selected from the group consisting of the metals aluminum, zinc, magnesium, copper, tin, lead, iron, alloys of the metals, temperature and oil-resistant thermoplasts and thermosetting plastics;

forming the material into a substantially cylindrical casing body having an inner wall from which interior fittings extend inwardly;

forming the material into an inner body in the form of a central peg having an axial, round or polygonal opening and an outer wall from which interior fittings extend radially outwardly at most to the inner wall of the cylindrical casing of the casing body while being complementary to the interior fittings of the casing body;

combining the interior fittings of the inner body with the interior fittings of the casing body to form an upper surface, a lower surface, annular shoulders each being disposed at a respective one of the upper and lower surfaces for rotation at a distance from the central axis, annular chambers each being enclosed by a respective one of the annular shoulders, two groups of liquid passage channels for carrying flows in opposing directions, and partition walls separating the liquid passage channels, one of the groups of liquid passage channels serving for throughflow in a traction stage and the other of the groups of liquid passage channels serving for throughflow in a pressure stage, the liquid passage channels of one of the groups having inlet openings disposed radially outside the rotating annular shoulder of the upper surface, penetrating the parts substantially in the direction of the central axis at an incline and terminating at the lower surface in outlet openings in the annular chamber, the liquid passage channels of the other of the groups having inlet openings disposed radially outside the rotating annular shoulder of the lower surface, penetrating the parts substantially in the direction of the central axis at an incline and terminating at the upper surface in outlet openings in the annular chamber;

fitting a tube with an axial passage for receiving a piston rod into the opening in the peg;

combining the tube, the inner body and the outer body; and detachably connected the inner body and the casing body with each other.

24. A method for manufacturing a blank for a shock-absorbing piston, which comprises:

punching and subsequent shaping a material selected from the group consisting of moldable sheets of the metals copper, brass, aluminum, steel and alloys of the metals;

forming the material into a substantially cylindrical casing body having an inner wall from which interior fittings extend inwardly;

forming the material into an inner body in the form of a peg having an axial passage for receiving a piston rod extending along a central axis of he blank, an outer wall from which interior fittings extend radially outwardly at most to the inner wall of the cylindrical casing of the casing body while being complementary to the interior fittings of the casing body;

inserting the inner body into the casing body and combining the interior fittings of the inner body with the interior fittings of the casing body to form an upper surface, a lower surface, annular shoulders each being disposed at a respective one of the upper and lower surfaces for rotation at a distance from the central axis, annular chambers each being enclosed by a respective one of the annular shoulders, two groups of liquid passage channels for carrying flows in opposing directions, and partition walls separating the liquid passage channels, one of the groups of liquid passage channels serving for throughflow in a traction stage and the other of the groups of liquid passage channels serving for throughflow in a pressure stage, the liquid passage channels of one of the groups having inlet openings disposed radially outside the rotating annular shoulder of the upper surface, penetrating the parts substantially in the direction of the central axis at an incline and terminating at the lower surface in outlet openings in the annular chamber, the liquid passage channels of the other of the groups having inlet openings disposed radially outside the rotating annular shoulder of the lower surface, penetrating the parts substantially in the direction of the central axis at an incline and terminating at the upper surface in outlet openings in the annular chamber; and detachably connected the inner body and the casing body with each other.

25. The method according to claim 22, which comprises producing the inner body and the casing body from a material selected from the group consisting of iron and iron alloys, and covering the inner body and the casing body with a magnetite layer by treatment with water vapor.

26. The method according to claim 23, which comprises producing the inner body and the casing body from a material selected from the group consisting of iron and iron alloys, and covering the inner body and the casing body with a magnetite layer by treatment with water vapor.

27. The method according to claim 24, which comprises producing the inner body and the casing body from a material selected from the group consisting of iron and iron alloys, and covering the inner body and the casing body with a magnetite layer by treatment with water vapor.

28. A method for manufacturing a shock-absorbing piston, which comprises:

forming a substantially cylindrical casing body having an inner wall from which interior fittings extend inwardly;

forming an inner body in the form of a peg having an axial passage with a central axis, an outer wall from which interior fittings extend radially outwardly at most to the inner wall of the cylindrical casing of the casing body while being complementary to the interior fittings of the casing body;

inserting the inner body into the casing body and combining the interior fittings of the inner body with the interior fittings of the casing body to form an upper surface, a lower surface, annular shoulders each being disposed at a respective one of the upper and lower surfaces at a distance from the central axis, annular chambers each being enclosed by a respective one of the annular shoulders, and two groups of liquid passage channels for carrying flows in opposing directions, the liquid passage channels of one of the groups having inlet openings disposed radially outside the annular shoulder of the upper surface and terminating at the lower surface in outlet openings in the annular chamber, the liquid passage channels of the other of the groups having inlet openings disposed radially outside the rotating annular shoulder of the lower surface and terminating at the upper surface in outlet openings in the annular chamber; and detachably connecting the inner body and the casing body with each other.

* * * * *